(12) United States Patent
Vaskevich et al.

(10) Patent No.: US 9,471,321 B2
(45) Date of Patent: Oct. 18, 2016

(54) METHOD AND APPARATUS FOR CONTROLLING FETCH-AHEAD IN A VLES PROCESSOR ARCHITECTURE

(75) Inventors: Lev Vaskevich, Rehovot (IL); Mark Elnekave, Ramat Hasharon (IL); Yuval Peled, Kiryat Ono (IL); Idan Rozenberg, Raanana (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 517 days.

(21) Appl. No.: 14/008,583

(22) PCT Filed: Mar. 30, 2011

(86) PCT No.: PCT/IB2011/051357
§ 371 (c)(1),
(2), (4) Date: Sep. 30, 2013

(87) PCT Pub. No.: WO2012/131434
PCT Pub. Date: Oct. 4, 2012

(65) Prior Publication Data
US 2014/0025931 A1 Jan. 23, 2014

(51) Int. Cl.
*G06F 9/30* (2006.01)
*G06F 9/38* (2006.01)

(52) U.S. Cl.
CPC .......... *G06F 9/3802* (2013.01); *G06F 9/3814* (2013.01); *G06F 9/3853* (2013.01)

(58) Field of Classification Search
CPC ....................................................... G06F 9/30
See application file for complete search history.

(56) References Cited

U.S. PATENT DOCUMENTS

| 7,103,757 | B1 | 9/2006 | Kashyap |
| 8,006,070 | B2 | 8/2011 | Gschwind et al. |
| 2003/0088740 | A1 | 5/2003 | Henry et al. |
| 2006/0271766 | A1* | 11/2006 | Vasekin ............... G06F 9/3802 712/207 |
| 2007/0204267 | A1 | 8/2007 | Cole et al. |
| 2007/0226462 | A1 | 9/2007 | Scott et al. |
| 2008/0229071 | A1 | 9/2008 | Shioya et al. |
| 2009/0199190 | A1 | 8/2009 | Chen et al. |

FOREIGN PATENT DOCUMENTS

WO 2009009704 A1 1/2009

OTHER PUBLICATIONS

Lee Y.: "Design of a Prefetch Unit of a Variable Length Instruction Superscalar Microprocessor", The Journal of Korea Information and Communications Society, vol. 20, No. 4, 1995. 04, pp. 962-976.
International Search Report and Written Opinion correlating to PCT/IB2011/051357 dated Nov. 29, 2011.

* cited by examiner

Primary Examiner — Cheng-Yuan Tseng (57) ABSTRACT

There is provided a method for controlling fetch-ahead of Fetch Sets into a decoupling First In First Out (FIFO) buffer of a Variable Length Execution Set (VLES) processor architecture, wherein a Fetch Set comprises at least a portion of a VLES group available for dispatch to processing resources within the VLES processor architecture, comprising, for each cycle, determining a number of VLES groups available for dispatch from previously pre-fetched Fetch Sets, and only requesting a fetch-ahead of a next Fetch Set in the next cycle if one of a select set of criteria related to the number of VLES groups available for dispatch is true.

12 Claims, 5 Drawing Sheets

METHOD AND APPARATUS FOR CONTROLLING FETCH-AHEAD IN A VLES PROCESSOR ARCHITECTURE

FIELD OF THE INVENTION

This invention relates to a method and apparatus for controlling fetch-ahead in a processor architecture, most particularly, in a Variable Length Execution Set processor architecture.

BACKGROUND OF THE INVENTION

In recent years, there has been an explosion in the use of mobile computing devices, such as smart phones, personal navigation devices, tablets (and other small form factor general computing devices), portable entertainment devices, personal games machine and the like.

There are a number of factors driving the uptake of mobile devices, and these include: the increased availability of mobile communication network bandwidth at reasonable cost (through the rollout of comprehensive mobile data networks, such as 3G/4G, wireless WAN technology—e.g. WiMAX—and the like); increased battery energy density/capacity (especially due to the introduction and improvements in Lithium Ion type batteries); and improved Integrated Circuits (IC) having increased computational capabilities whilst consuming relatively less power.

To improve the computational capability of Integrated Circuits (both mobile and, indeed, non-mobile) increased operating frequencies are used, whilst power consumption is not increased, so that the resultant Integrated Circuit not only has sufficient processing power to carry out the increasingly demanding operations of a user (e.g. streaming moving video over high speed mobile data networks), but also at a power consumption level that allows sufficient length of use of the mobile device whilst it is operating on battery power alone. These improvements to Integrated Circuits not only impact their use in mobile devices, but also improves devices meant for fixed power supplies (i.e. "mains" power), as reduced power requirements of the Integrated Circuits leads to more efficient "mains" operated hardware (through such things as reduced absolute power requirement of the IC, and a corresponding reduction in the IC cooling requirements). A lot of equipment used to create the infrastructure of communication networks or systems are "mains" powered devices. Examples of such infrastructure systems include mobile network base stations, internet switches and video conferencing equipment.

Any movement of data within a processor architecture, for example the data transfers of instructions and related operational data from memory in to the respective processing resources to executed those instructions, consumes power. Therefore, as the number of data transfers within a processor architecture increases, so too does the power consumption of the processor architecture. Reducing unnecessary memory transactions may reduce wasted power.

SUMMARY OF THE INVENTION

The present invention provides a method and apparatus for controlling fetch-ahead in a Variable Length Execution Set processor architecture, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part be implemented using electronic components and circuits known to those skilled in the art, details will not be explained in any greater extent than that considered necessary as illustrated above for the understanding and appreciation of the underlying concepts of the present invention and in order not to obfuscate or distract from the teachings of the present invention.

Examples of the present invention may be used in Very Long Instruction Word (VLIW) processor architectures. However, the invention is not so limited. 'VLIW' refers to a processing resource architecture designed to take advantage of instruction level parallelism (ILP), where the term 'processing resource' includes any circuitry capable of processing instructions, examples of which include execution units, Load store units and the like. The VLIW processing resource approach may execute instructions in parallel based on a fixed schedule of instruction execution produced during the compilation stage (i.e. where higher level languages, such as C+, C++, C#, BASIC, etc, are complied into a set of processing resource specific instructions for execution). This sort of processing resource may also be referred to as 'pipelined', since one or more pipelines of instructions are provided, each independently executable to one another.

Modern long pipeline processor architectures may use fetch-ahead (i.e. pre-fetching) of instructions to prevent processing resource instruction starvation. During the fetch-ahead process, a controller within the processor architecture may pre-load instructions into a decoupling FIFO buffer from an Instruction Cache (I-Cache), ready for dispatch to suitable individual processing resources in advance of when those instructions might be needed. Instructions may also be pre-loaded from other parts of the overall system memory. The difference between an I-Cache and other memory is that the I-Cache is usually much faster and holds a copy of the most relevant memory values for current execution.

However, regardless of the source of the pre-fetched instructions, over aggressive fetch-ahead causes unnecessary I-Cache evictions, and because each memory access associated with a fetch-ahead operation takes up capacity on the processor buses (or the like), and takes up energy, this results in increased power consumption and reduced available system bus bandwidth overall.

The fetch-ahead rate may be managed, so that it remains at a level that does not starve the processing resources of instructions, whilst also allowing for reduced unnecessary I-Cache evictions. In turn, reduced I-Cache evictions results in less subsequent, unnecessary, I-Cache misses, thus improving performance, while also reducing power consumption by eliminating unnecessary transactions. This also beneficially increases system bus bandwidth by eliminating unnecessary transactions that would otherwise take up bus bandwidth capacity.

Accordingly, it is proposed to provide a multiple threshold dynamic control system for Instruction pre-fetch that provides for a minimum of necessary program bus transactions, thereby providing improved power consumption, whilst maintaining optimum performance.

A particular form of VLIW processing architecture is the Variable Length Execution Set (VLES). As the name suggests, in a VLES processor architecture, concurrently process-able instructions are dispatched to the various available processing resources (Execution Units, Load Store Units, and the like) for execution in groups of variable length (hereinafter referred to as a VLES group). The length varies because the particular piece of code being executed on the particular form of processor architecture means the type and number of instructions that are actually concurrently process-able varies. Meanwhile, the instructions are typically read into the decoupling FIFO buffer from the I-Cache using a fixed size (i.e. fixed width) input, called a Fetch Set. The exact size of a Fetch Set is a characteristic of the particular processor implementation, and may be of any suitable size, for example 256 bits (=8×32 bit instructions). Therefore, there is a fixed stride input and a variable stride output to the decoupling FIFO buffer. Furthermore, VLES groups may not all be loaded in from the I-Cache during the same Fetch Set. Instead, they may run across two or more Fetch Sets, and each input cycle/Fetch Set may be thought of as a 'chunk' of input data having at least a portion of a VLES group of instructions.

Figure 1:
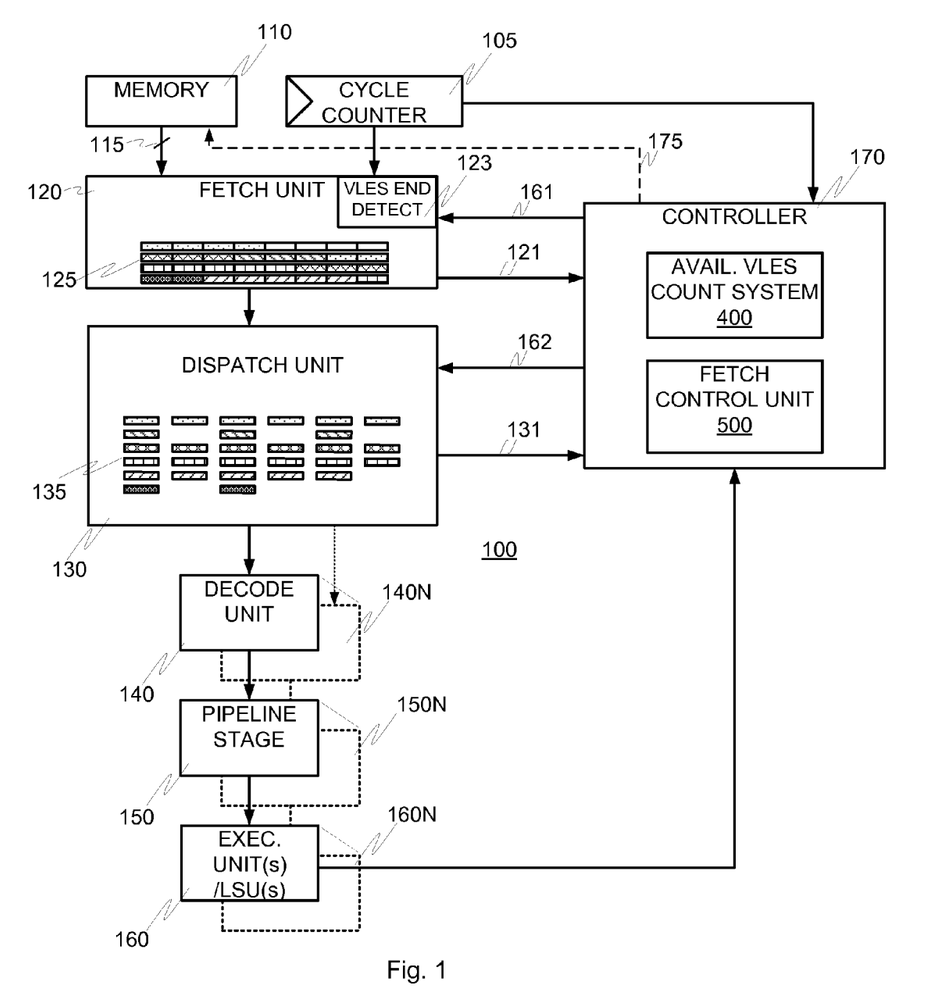
FIG. 1 schematically shows an example of a processor architecture.

FIG. 1 schematically shows an example of a processor architecture 100.

Processor architecture 100 includes program cycle counter 105, memory unit 110, fetch unit 120, dispatch unit 130, controller 170 and one or more: decode unit(s) 140, pipeline stage(s) 150, processing resource(s) 160 (such as Execution Units, Load Store Units, or the like). The dispatch unit 130 may dispatch data to multiple sets of decode units 140N, pipeline stages 150N, and processing resources 160N. The memory unit 110 may comprise any suitable memory resource within the computing system that contains relevant instructions, and may include, for example, the I-Cache, Level 1/2/3 cache memory, or main external memory.

Pipeline stages 150N can belong to multiple types of processing resource (e.g. core), such as digital signal processing cores, general purpose cores and the like. The processing sequence of an instruction may involve processing the instruction by relevant pipeline stages, either in-order or out-of-order. At the end of each execution cycle, the variable length groups of instructions (VLES groups) are typically sent from one pipeline stage to the next. The pipeline stages can include additional units and are not limited to those shown in FIG. 1. The number of pipeline stages can vary from one processor architecture to another, as well as the maximal length of instruction groups that can be concurrently processed by the processor architecture. Typical pipelines may include more than eight pipeline stages. A variable length group of instructions may also be referred to as Very Long Instruction Word.

Figure 3:
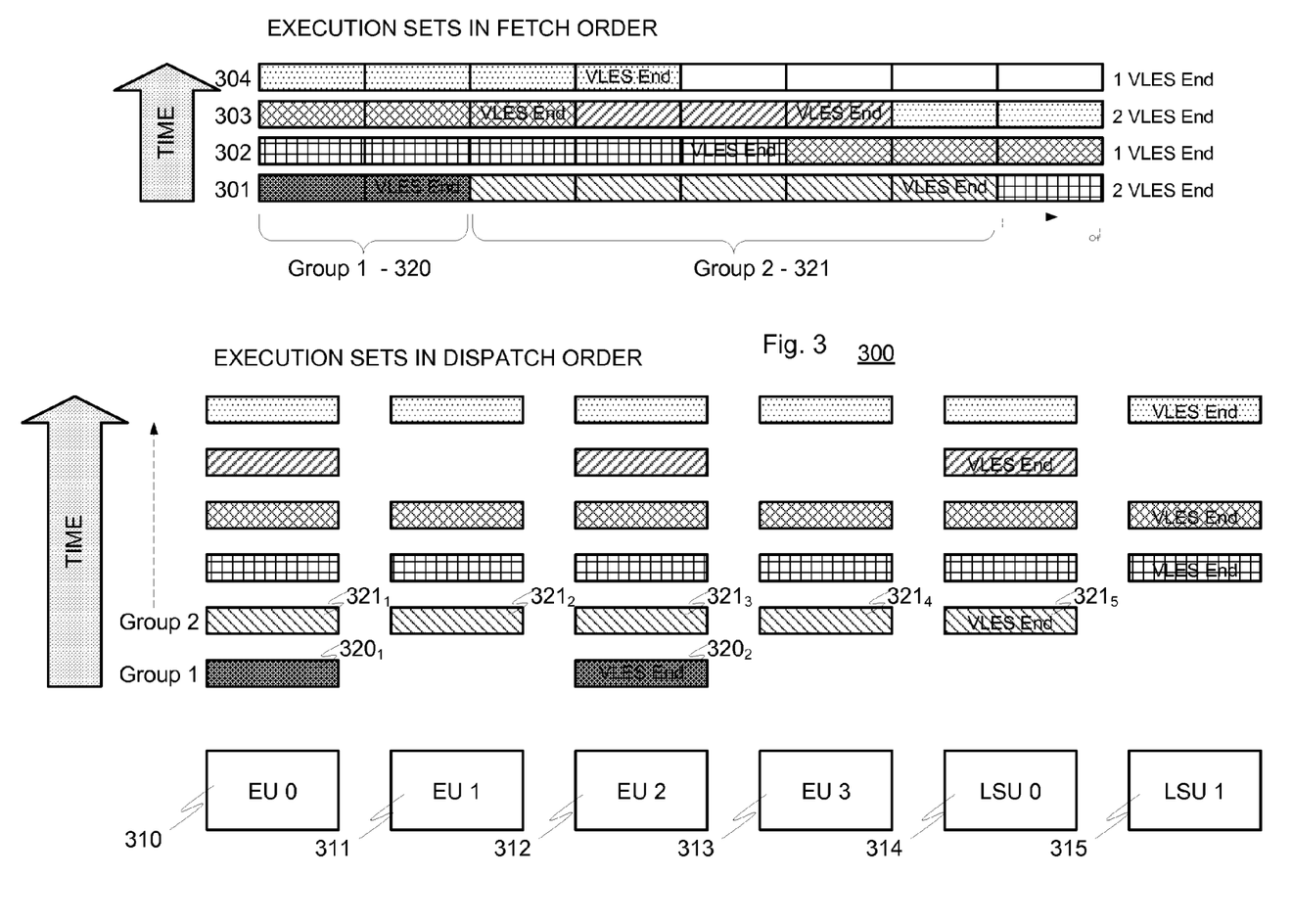
FIG. 3 shows an example of how a VLES processor architecture loads instructions into a decoupling FIFO buffer 125 and dispatches concurrently process-able instructions to the various available processing resources.

The fetch unit 120 is arranged to fetch VLIWs from memory unit 110 and more particularly to fetch the fixed size Fetch Sets (that are fixed size chunks of information that includes whole, or portions of, VLES groups). Fetch unit 120 includes a decoupling First In First Out (FIFO) buffer 125 that stores the Fetch Sets. As shown in FIG. 3, a VLES group can be wider than an associated Fetch Set, or smaller. Therefore, the number of VLES groups made available for dispatch from each Fetch Set can vary from zero to many.

Fetch unit 120 may receive from controller 170 (via input 161) target addresses of VLES groups (or rather Fetch Sets) to be fetched from memory unit 110 via instruction bus 115. The memory unit 110 may be provided relevant addresses by the controller 170 over control bus 175.

Dispatch unit 130 may include logic to dispatch the available VLES groups stored in the decoupling FIFO buffer 125 to particular processing resources 160. It is noted that the number of VLES groups that are stored in decoupling FIFO buffer 125 may depend on the size of decoupling FIFO buffer 125 used.

Controller 170 may include Available VLES count system, 400, comprising computer logic configured to count the number of VLES groups made available for dispatch as described below in relation to FIGS. 2 to 6. In alternative examples, such circuitry may be formed within other portions of the overall processor architecture, such as the dispatch unit 130 instead (not shown). The Available VLES count system 400 typically includes the Available VLES counter 430 (see FIGS. 4 and 5). Similarly, controller 170 may also include Fetch control unit 500, comprising computer logic arranged to control the fetch-ahead process also as described below. In alternative examples, such circuitry may be formed within the fetch unit 120 instead (not shown). The Available VLES counter may also be formed within any suitable portion of the overall processor architecture, such as the controller 170, fetch unit 120 or dispatch unit 130.

Where both the Available VLES count system 400 and Fetch Control unit 500 are formed within the controller 170, control buses in 161 and out 121 of the fetch unit 120, and in 162 and out 131 of the dispatch unit 130 are coupled to the controller 170 (as shown). Similar control buses may be used where the Available VLES count system 400 is located in other portions of the processor architecture.

Figure 2:
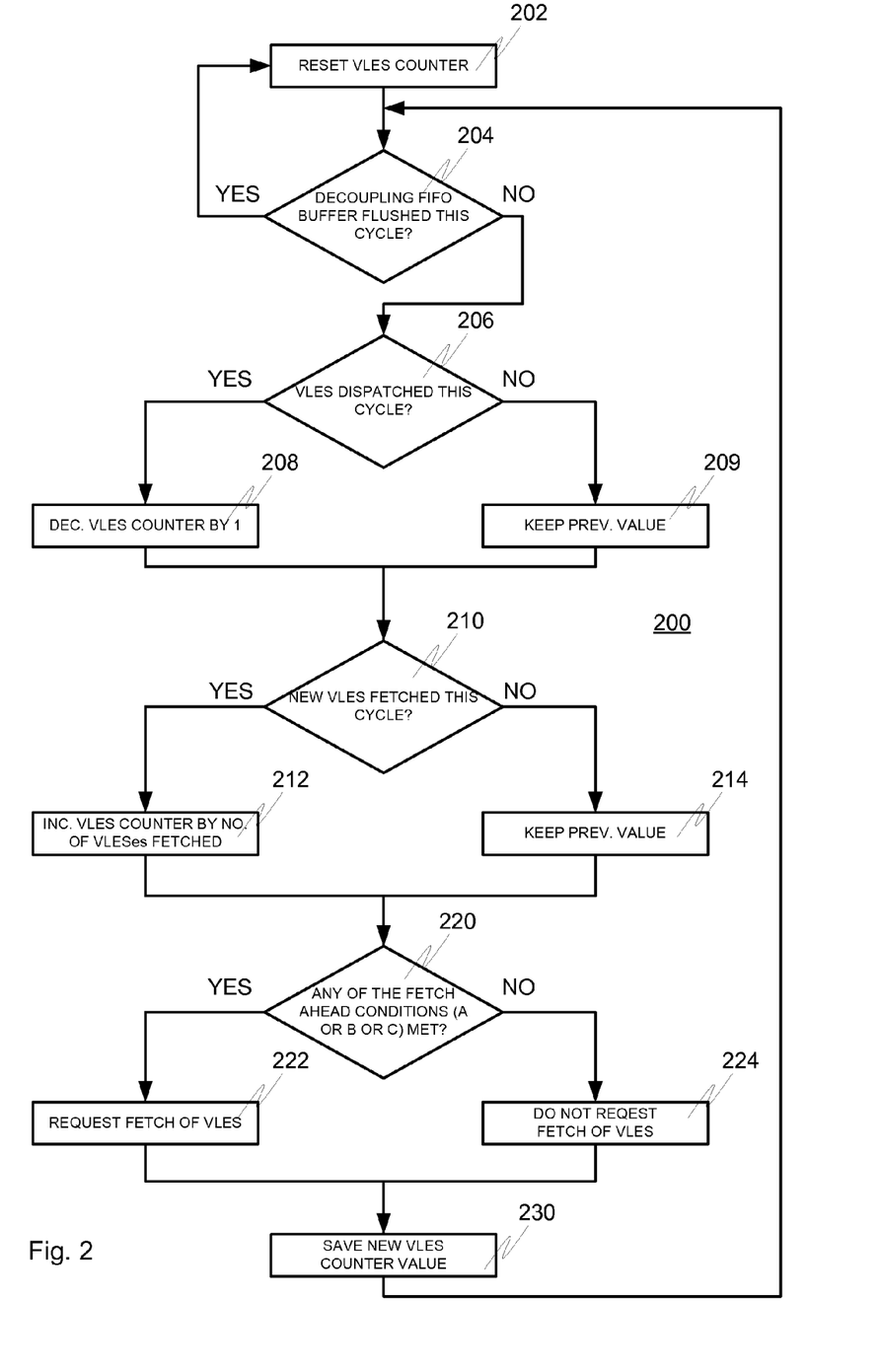
FIG. 2 shows a flow chart of a method according to an exemplary embodiment of the invention.

FIG. 2 shows a flow chart of the method 200 according to an exemplary embodiment of the invention.

The method starts at step 204, by checking for a decoupling FIFO buffer flush (due to a change of flow, or the like), and if this is the case, resetting the available VLES counter 202. If there is no FIFO buffer flush, the method continues, by checking whether an available VLES group has been dispatched to one or more of the processing resources 160N at step 206. A positive response results in the Available VLES counter being decreased by one, 208, because a single VLES group has been dispatched to the processing resources for execution, and a negative response results in the Available VLES counter value being kept at the previous value, 209. Such negative response may happen, for example, if a 'halt' or similar interfering control signal has been received by the processor architecture. A VLES processor architecture may only dispatch one VLES group at a time, per cycle (i.e. a single VLES group may be dispatched if any are available, and zero may be dispatched if there are no VLES groups available for dispatch).

Next, a check is carried out to see whether one or more completed VLES groups has been loaded into the decoupling FIFO buffer 210 from a previously requested Fetch Set. If one or more completed VLES groups has been loaded into the decoupling FIFO buffer 210, the Available VLES counter is increased by the number of VLES groups now completed and available to dispatch, 212. If there have been no completed VLES groups loaded in the last requested Fetch Set (i.e. memory access), the Available VLES counter is kept at the previous value 214.

In the next cycle, the fetch ahead conditions (A to C, discussed below) are checked for assertion 220, providing a control output to the Fetch unit 120. This check may result in either a request for a fetch of a next Fetch Set containing some or all of one or more VLES groups being sent 222, or no fetch request being sent 224. FIG. 2 is a general flow of the algorithm without going into cycle timing specifics.

Finally, the updated Available VLES counter value is saved, ready for use in the next clock cycle, and the method returns to step 204, to check for a FIFO buffer flush.

FIG. 3 shows in more detail how a VLES processor architecture loads instructions into the decoupling FIFO buffer 125 in the form of a Fetch Set loaded in from the I-Cache during a fetch-ahead process (top of figure) and dispatches VLES groups available for dispatch (i.e. concurrently process-able instructions) to the various available processing resources 310-315 (bottom of figure) specifically available in this example of a VLES processing architecture. For both graphs, time is shown on the Y axis, starting at the bottom.

In particular, FIG. 3 shows a first Fetch Set 301, a second Fetch Set 302, third Fetch Set 303 and fourth Fetch Set 304. The first Fetch Set 301 comprises a first concurrently process-able group 320 (comprising only two instructions in this example), a second concurrently process-able group 321 (comprising five instructions) and a remaining single instruction (that will form part of the next concurrently process-able group that is only completed in the second Fetch Set 302).

After each Fetch Set is loaded into the decoupling FIFO buffer 125, the Fetch Set is analysed for the number of completed groups of instructions, i.e. VLES groups, that may be made available for dispatch. It is possible for a particular Fetch Set to contain no VLES groups available for dispatch, because the VLES group spans more than one Fetch Set.

In FIG. 3, the number of available VLES groups is shown for the example fetch order as a count on the right hand side of the Y-axis, where, in this case, the first Fetch Set 301 provides two completed VLES groups, the second Fetch Set 302 provides one completed VLES group, the third Fetch Set 303 provides two completed VLES groups, and so on (1 VLES End, 2 VLES End, 1 VLES End, etc). The number of completed VLES groups per Fetch Set will vary according to the specific formation of the instruction code and what processing resources are available in the processor architecture as a whole (for example, depending on the number of independently usable processing resources, the size of the Fetch Sets, etc). The invention is in no way limited by the number of VLES groups completed and made available for dispatch per clock cycle.

The bottom half of FIG. 3 shows how the VLES groups available for dispatch are mapped and dispatched to the respective processing resources (Execution Units 310 to 313 and Load Store Units 314 and 315), over time. For example, the first instruction of VLES Group 1, $320_1$, is dispatched to Execution Unit 0, 310, whilst the second instruction of VLES Group 1, $320_2$, is dispatched to Execution Unit 2, 312. The exact way in which a dispatch unit maps instructions ready for execution onto suitable processing resources is not important to the correct working of this invention, and is well known in the art, therefore will not be explained in any greater detail here.

In a similar way, the individual instructions of VLES Group 2, $321_1$ to $321_5$, are mapped onto Execution Units 0 to 3 and Load Store Unit 0, items 310-314, respectively. The number of available processing resources will vary according to the specific form of processor architecture in use, and may comprise a plurality of similar units (homogenous) or a mixture of different processing resources (heterogeneous), and the invention is not limited to any particular make up of processing resources.

To provide an improved fetch-ahead control mechanism, examples of the present invention comprise a VLES dispatch unit 130 arranged to dispatch concurrently processable instructions that are ready for execution to the various processing resources, a VLES end detector 123 for detecting ends of completed VLES groups within the pre-fetched Fetch Sets, an Available VLES counter 430 arranged to count the number of completed VLES groups within the pre-fetched Fetch Sets and hence available for dispatch, and a fetch-ahead control unit 500 testing for particular conditions that control the fetch-ahead process, as described below.

Figure 4:
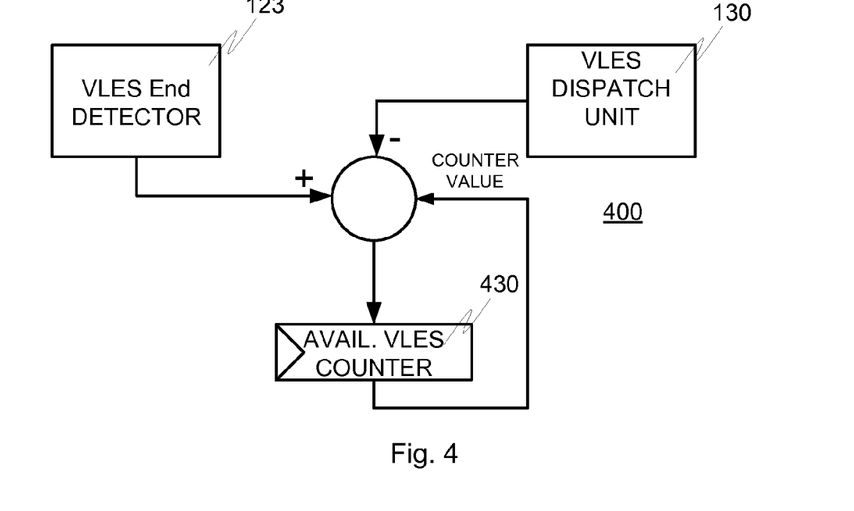
FIG. 4 shows a more detailed schematic diagram of an example of an Available VLES count system.

FIG. 4 shows a more detailed schematic diagram of an example of the Available VLES count system 400 of FIG. 1. The available VLES count system 400 shown comprises the Available VLES counter 430 operably coupled to the VLES End detector 123 and VLES dispatch Unit 130. The VLES end detector 123 may increment the Available VLES counter 430 once for each fully finished VLES group detected within the most recently pre-fetched Fetch Set in the decoupling FIFO buffer 125 from the memory unit 110 (i.e. from the I-Cache, or other memory in the computing system), i.e. the combined system counts the number of VLESes available for dispatch from the last requested Fetch Set. The VLES end detector 123 can detect more than one VLES end per Fetch Set, or no VLES ends, as discussed above.

Meanwhile, the VLES dispatch Unit 130 decrements the Available VLES counter 430 by one for each VLES group that is dispatched to the processing resources (items 310-315). Typically, there is only one VLES group dispatched per cycle. Both events can happen simultaneously, so it is possible that there is no change to the available VLESes if only a single VLES end is detected in a single fetch-ahead cycle. During normal operation, the VLES dispatch Unit 130 does not typically stop dispatching VLESes available for processing, as long as they are available in the decoupling FIFO Buffer 125. This is why it is possible to cause starvation of the processing resources if the fetch-ahead process is not controlled properly so that the decoupling FIFO buffer empties.

Figure 5:
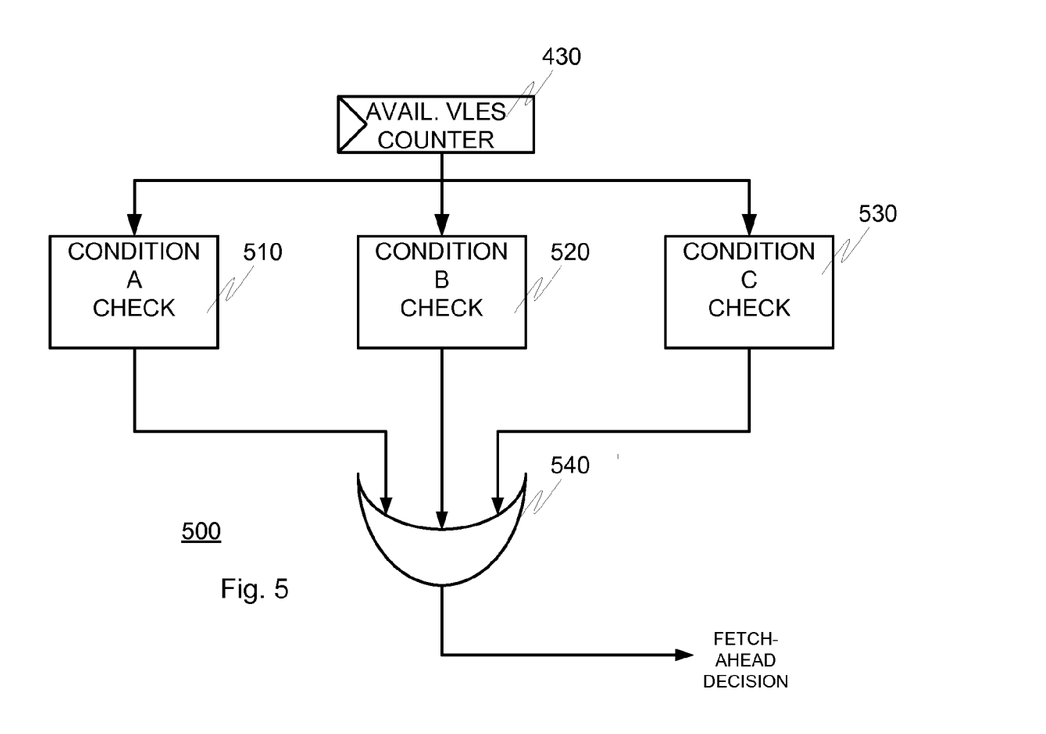
FIG. 5 shows an example of how a fetch-ahead control unit controls how a fetch-ahead proceeds based on system conditions.

FIG. 5 shows an example of how a fetch-ahead control unit 500 may control how the fetch-ahead proceeds based on system conditions.

The fetch-ahead control unit may comprise computer logic that tests for three system conditions in particular: Condition A 510, Condition B 520 and Condition C 530, and proceeds with a fetch-ahead cycle (only) if any one (or more) of the Conditions A to C are met. This is to say, the outputs of the three condition checks are logical ORed (i.e. Boolean OR operation) together to control a new fetch-ahead. The output is a fetch-ahead decision. The test conditions are as follows:

Condition A is asserted if the Available VLES counter 430 value<a 'starvation threshold', which is a predetermined threshold level above where starvation of the processing resources 310-315 may occur, based on the time it takes the system to fetch Fetch Sets and process instructions within those Fetch Sets. This condition generally ensures that there are always enough pre-fetched instructions in the decoupling FIFO buffer 125 to ensure at least one of the processing resources is being used each cycle. When the decoupling FIFO buffer 125 is below the 'starvation threshold', for example, when a change of flow makes the content of the decoupling FIFO buffer 125 no longer relevant, requiring a flush and reload of the decoupling FIFO buffer, the fetch-ahead control unit 500 may ensure the fetch-ahead is carried out very aggressively (i.e. fetches ahead as much as possible, i.e. on each successive cycle). This may result in any instruction starvation only occurring for as short a period as possible. Once the 'starvation threshold' is surpassed, the fetch-ahead control unit may then return to a less aggressive fetch-ahead, i.e. only fetching when absolutely necessary, as described herein.

Condition B is asserted if the Available VLES counter 430 value=a predetermined "Upper limit threshold" AND (i.e. Boolean AND operation), in the previous cycle, the Available VLES counter 430 was above the "Upper limit threshold" (i.e. ="Upper limit threshold"+1). This condition ensures that as the "Upper limit threshold" is passed on the way down, a new fetch-ahead occurs to refill the decoupling FIFO buffer 125. The predetermined "Upper limit threshold" is set according to the specific formation of the processor architecture in use, and typically relates to the 'breaking distance' of the processor architecture (i.e. how long it takes between a memory access and the data accessed from memory becoming available for dispatch) combined with the 'starvation threshold'. This may be, for example, set to be 10.

Condition C is asserted if the Available VLES counter 430 value is ≥ the 'starvation threshold' AND (i.e. Boolean AND operation) the Available VLES counter 430 value is ≤ the "Upper limit threshold" AND in the previous cycle a Fetch Set was counted and added it's VLES End count to the Available VLES counter. This condition ensures that if a fetch-ahead operation does not succeed in getting above the "Upper limit threshold" (because, for example, the last fetch-ahead did not actually contain any VLES ends), then another fetch-ahead is issued immediately.

It will be appreciated that the three test conditions above operate to maintain the decoupling FIFO buffer 125 at a level around the "Upper limit threshold", which is a position that usually results in there being sufficient instructions available for dispatch (i.e. little or no processing resource starvation), whilst limiting the excess pre-fetched instructions to a minimum, hence keeping unnecessary I-Cache flushes to a minimum also. There cannot be any instruction starvation if the number of available VLES groups remains around the upper limit. Starvation may occur only if the number of VLESes available is zero and no Fetch Sets are arriving from the I-Cache or other memory.

Figure 6:
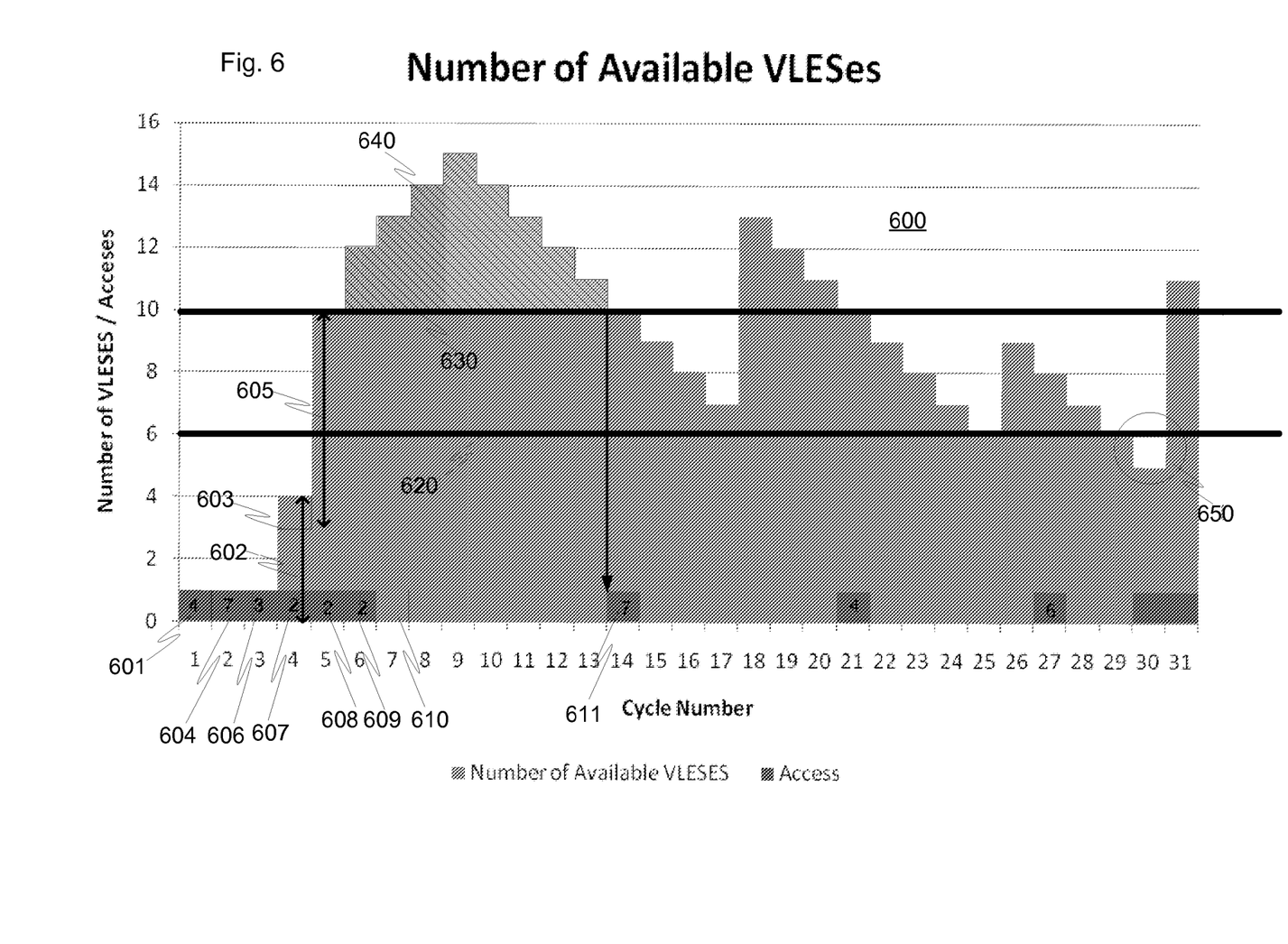
FIG. 6 shows an example of how the content of the decoupling FIFO buffer changes over time according to the available VLES content of the memory accesses loading Fetch Sets containing instructions for execution.

FIG. 6 shows an example of how the content of the decoupling FIFO buffer 125 may change over time 600 according to the available VLES content of the memory accesses loading Fetch Sets containing instructions for execution from the memory 110 (either the I-Cache or other system memory, such as Level 1/2/3 caches or main external memory), under control of the fetch-ahead control unit 500 as described above in relation to FIG. 5.

The 'starvation threshold' 620 and "Upper limit threshold" 630 may be both predetermined based on the characteristics of the overall processor architecture. For example, the 'starvation threshold' may be related a minimum time it takes the processor architecture in use to fetch and process a VLES group for dispatch from a Fetch Set, divided by the number of VLESes dispatched per cycle. In the example shown, the processor architecture takes a minimum of 4 cycles (inclusive) from the start of a Fetch Set request to provide the requested data (i.e. a 4 cycle memory latency), a single cycle to count the number of available VLES groups within the requested Fetch Set and add them to the Available VLES counter, and a further single cycle to provide the next fetch request. Therefore the "starvation threshold" is 6 divided by 1=6. Meanwhile, the Upper limit threshold is based upon the "starvation threshold" plus the memory latency. In the example shown, the minimum memory latency is 4, therefore the upper threshold limit is 6+4=10. Other delay periods may be applicable and the invention is not limited by the particular delay period experienced.

Both thresholds are shown as lines across the Y-axis, and may be predetermined according to the operational characteristics of the overall processor architecture. When a Fetch Set is not present in the I-Cache, it may need to be fetched from a memory further down the memory hierarchy, which can result in a Fetch Set taking more than the exemplary 4 cycles (inclusive) noted above to pre-fetch.

FIG. 6 starts with the decoupling FIFO buffer empty. This may occur for example when the system is first powered on, or when change in flow or the like results in a complete FIFO buffer flush.

Prior to cycle 1, 601, the number of available pre-fetched instructions has been zero, and no previous memory accesses have occurred, so the number of available VLES groups is still zero at the start of cycle 1. Therefore, Condition A is fulfilled and the decoupling FIFO buffer pre-fetch regime starts in cycle 1, with a pre-fetch. It can be seen later on (at cycle 4) that the first Fetch Set has 4 VLES groups available for dispatch within it. In the particular example shown, there is a delay of 4 cycles between when each pre-fetch memory access occurs and when the data from the pre-fetch is actually ready for dispatch from the decoupling FIFO buffer 125 to the processing resources, with the VLES content analysed. Thus, the first memory access causes the number of available VLES groups to jump to 4, but only after the delay at cycle 4—item 602.

At the start of cycle 2, 604, because the first memory access (i.e. Fetch Set) is still within the delay period (i.e. has not yet had the time to produce any ready VLES groups), the number of available VLES groups is still 0, and therefore well below the 'starvation threshold'. Condition A is still applicable, therefore the fetch-ahead process continues (this time resulting in 7 completed VLES groups being accessed, 4 cycles later). However, by the time they are actually available at the decoupling FIFO buffer 125 after the delay (sometime during cycle 5, 608), one completed VLES group from the first memory access will have been dispatched to the respective processing resources available in the processor architecture. Therefore, the graph only shows a rise of 6 in the number of available VLES groups at cycle 5. This is shown as box 603, i.e. the difference between the completed VLES content of the first data pre-fetch (arrow 602) compared to the content size of the second data pre-fetch (arrow 605). Thus, at cycle 5 (i.e. 4 cycles, inclusive, later than the second pre-fetch), there is shown 10 available VLES groups (i.e. (4+7)−1=10).

At the start of cycle 3, 606, again because the first memory access is still within the delay period (i.e. has not yet had the time to produce any ready VLESes), the number of available VLES groups is still 0, and therefore still well below the 'starvation threshold'. Condition A is still applicable, therefore the fetch-ahead process continues, this time resulting in 3 completed VLES groups being accessed. However, by the time these completed VLES groups are actually available at the decoupling FIFO buffer 125 after the delay (in cycle 6, 609), another single VLES group available for dispatch from the first memory access will have been dispatched to the respective processing resources available in the processor architecture. Therefore, the graph only shows a rise of 2 at cycle 6 (i.e. (10+3)−1=12).

At the start of cycle 4, 607, the data from the first pre-fetch has still not yet arrived and been analysed for VLES content (more particularly, the available VLES counter is only updated at the end of a cycle. Therefore, the updated Available VLES counter value can only influence a fetch-ahead decision on the next cycle). Condition A is still applicable, therefore the fetch-ahead process continues, this time resulting in 2 completed VLES groups being accessed, to be ready for dispatch 4 inclusive cycles later.

At the start of cycle 5, 608, the data from the first pre-fetch has arrived and been analysed for VLES content, showing 4 VLESes available for dispatch. This is a figure below the 'starvation threshold', so Condition A is still valid, and another fetch-ahead is carried out, this time resulting in another 2 completed VLES groups being accessed, to be ready for dispatch 4 inclusive cycles later.

At the start of cycle 6, 609, the data from the second pre-fetch has arrived and been analysed for VLES content, showing 7 VLES groups available for dispatch. With the one VLES group having been dispatched, this leaves the 10 available VLES groups ready for dispatch. This time, the starvation threshold has been exceeded, so Condition A is not valid. However, Condition C now applies, as the starvation threshold is exceeded AND the upper threshold is equalled AND there was a fetch-ahead resulting in a Fetch Set being counted in the previous cycle. Accordingly, another fetch-ahead is allowed in this 6th cycle, 609, again resulting in 2 completed VLES groups being accessed, to be ready for dispatch 4 cycles later (resulting in only an increase of 1 of the number of VLES groups available, again because one VLES has been dispatched to the respective processing resources at the same time, as discussed previously).

At the start of cycle 7, 610, the data from the third pre-fetch has arrived and been analysed for VLES content, showing 3 VLES groups available for dispatch. With the one VLES group having been dispatched, this leaves the 12 available VLES groups ready for dispatch. This time, Condition C no longer applies, because the "Upper limit threshold" has been exceeded. Therefore, no further fetch-ahead is allowed at this time. However, the fetch-aheads previously allowed (in cycles 4 to 6) are still ongoing, and within their respective delays, all 1 cycle apart. Accordingly, the number of available VLES groups ready for dispatch continues to climb, even though there are no more memory accesses providing Fetch Sets. This causes the overrun above the "Upper limit threshold", 640. By cycles 9/10, the already initiated memory accesses have stopped, so that the number of VLES groups ready for dispatch starts to drop, one at a time each cycle, as VLES groups are dispatched to the processing resources 160N for execution.

At the start of cycle 14, Condition B becomes valid, because the "Upper limit threshold" has been reached AND (i.e. Boolean AND operation) at the beginning of the previous cycle, the number of VLES groups was equal to the ("Upper limit threshold"+1). Therefore a fetch-ahead is allowed, resulting in a memory access, 611. This provides another 7 completed VLES groups, resulting in the number of VLESes jumping by 6 (taking into account the single VLES dispatch during the same cycle these 7 VLES groups reach the dispatch unit) in cycle 18. This example of a memory access takes a cycle longer than previously, because the Fetch Set was not actually available in the I-Cache, therefore the Fetch Set had to be brought in from another memory location in the memory hierarchy, resulting in an extra cycle delay (in this case). In between, the number of VLES groups ready for dispatch continues to decrease one each cycle, since there has not been any other pre-fetches since cycle 6, 609.

The rest of FIG. 6 follows the same principles as described above, however taking into account other example fetch-ahead delay lengths (due to the Fetch Set not being available in the I-Cache, and instead requiring a load from another memory location in the memory hierarchy). For example, the Fetch Set memory access in cycle 21 only provides the resultant VLES groups available for dispatch at cycle 26 (which is 7 cycles later, inclusive).

Another exemplary situation is shown at cycle 30, where the number of available VLES ready for dispatch actually falls below 650 the 'starvation threshold' 620. This may occur, for example, when the number of available VLES groups changes as shown and the particular form of the code being executed meant that there were no actual VLES groups made available for dispatch in the first Fetch Set requested as a result of one of the conditions (A, B or C discussed above) previously applying.

Accordingly, examples of the present invention provide a method and apparatus for pre-fetching instructions in a VLES processor architecture, in the form of a semiconductor Integrated Circuit having dynamic rate control using multiple thresholds. In examples provided, the number of VLES groups available for dispatch is continuously monitored so that the Fetch Set pre-fetching rate can be controlled more effectively, thereby achieving a minimum of number of program bus transactions relating to the maintenance of the decoupling FIFO buffer and I-Cache, and all without any user intervention for correct operation.

Such a fetch-ahead mechanism may prevent starvation, unless there is an I-Cache miss, due, for example, to a change of flow, or the like. The described fetch-ahead rate control mechanism does not require any side attributes to be maintained (i.e. no user intervention is required), or the use of any prediction calculating units to throttle the fetch-ahead process.

Examples of the present invention are not limited to pipelined processor architectures as used in the specific description above, and may also find utility in other areas of computing having 'fetch-ahead' characteristics (i.e. where data is loaded into some form of relatively fast access memory or buffer prior to use). Examples may include Direct Memory Access (DMA) where certain hardware within a computing system may access the memory (or other "data location") directly without recourse to using the Central Processing unit, or network packet processing where data is received over communications networks in packets, and the like. In such cases, the length of a data selection (e.g.

DMA data access or packet) may be variable, and noted within the data selection itself (e.g. the packet header having an indication of the (variable) length of the packet).

The invention may also be implemented in a computer program for running on a computer system, at least including code portions for performing steps of a method according to the invention when run on a programmable apparatus, such as a computer system or enabling a programmable apparatus to perform functions of a device, system or method according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing resource such as processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for controlling fetch-ahead of Fetch Sets into a decoupling First In First Out (FIFO) buffer of a Variable Length Execution Set (VLES) processor architecture, wherein a Fetch Set comprises at least a portion of a VLES group available for dispatch to processing resources within the VLES processor architecture, comprising, for each cycle:
   determining a number of VLES groups available for dispatch from previously pre-fetched Fetch Sets;
   logically ORing a result of testing for a first condition, a second condition, and a third condition to control fetch-ahead of a next Fetch Set,
   wherein the first condition comprises the number of VLES groups available for dispatch is less than a predetermined starvation threshold,
   the second condition comprises the number of VLES groups available for dispatch is indicative of going below a predetermined upper limit threshold, and
   the third condition comprises the number of VLES groups available for dispatch is indicative of being between the predetermined starvation threshold and the predetermined upper limit threshold, and a fetch-ahead of a Fetch Set occurred in an immediately previous cycle; and
   requesting fetch-ahead of the next Fetch Set in a next cycle only if one or more of the results of testing for the first condition, the second condition, and the third condition is true.

2. The method of claim 1, wherein said determining a number of VLES groups available for dispatch from previously pre-fetched Fetch Sets comprises:
   receiving an available VLES count value from a previous cycle indicative of a number of VLES groups available in an immediately previous cycle;
   determining a number of VLES groups made available for dispatch from an immediately previous pre-fetched Fetch Set; and
   adding the determined number of VLES groups made available for dispatch to the available VLES count value from a previous cycle to provide an updated number of VLES groups available for dispatch.

3. The method of claim 1, wherein the number of VLES groups available for dispatch is indicative of going below the predetermined upper threshold limit when an available VLES counter value equals the predetermined upper limit threshold and in an immediately previous cycle, the available VLES counter value equaled the predetermined upper limit threshold+1.

4. The method of claim 1, wherein the number of VLES groups available for dispatch is indicative of being between the predetermined starvation threshold and the predetermined upper limit threshold when the current available VLES counter value is:
   greater than or equal to the predetermined starvation threshold; and
   less than or equal to the upper threshold limit.

5. The method of claim 1, wherein determining the number of available VLES groups ready for dispatch from the previously pre-fetched Fetch Sets further comprises:
   determining if an available VLES group has been dispatched to the processing resources in the previous cycle; and
   decreasing an available VLES counter value by one if it is determined that an available VLES group had been dispatched.

6. The method of claim 2, wherein determining a number of VLES groups made available for dispatch from an immediately previous pre-fetched Fetch Set further comprises analysing the immediately previous pre-fetched Fetch Set to detect one or more VLES group ends.

7. The method of claim 1, further comprising determining if a flush operation has occurred and resetting an available VLES counter value to zero if the flush operation has occurred.

8. The method of claim 1, wherein the predetermined starvation threshold is set at a value based upon a minimum number of cycles taken for a Fetch Set memory access in combination with a minimum number of cycles taken to determine the number of VLES groups available for dispatch and request a next fetch-ahead, divided by the number of available VLES groups dispatched per cycle.

9. The method of claim 1, wherein the predetermined upper limit threshold is set at a value based upon the predetermined starvation threshold in combination with the minimum number of cycles taken for a Fetch Set memory access.

10. A fetch-ahead control apparatus for controlling fetch-ahead of Fetch Sets into a decoupling First In First Out (FIFO) buffer of a Variable Length Execution Set (VLES) processor architecture, wherein a Fetch Set comprises at least a portion of a VLES group available for dispatch to processing resources within the VLES processor architecture, comprising:

an available VLES counter operably coupled to a VLES end detector and a VLES dispatch unit, and configured to determine, for each cycle, a number of VLES groups available for dispatch from previously pre-fetched Fetch Sets;

a controller operably coupled to the available VLES counter and configured, for each cycle, to test for each of first, second, and third conditions, and to request a next fetch-ahead if one or more of the first, second, and third conditions is true, wherein the first condition includes the number of VLES groups available for dispatch is less than a predetermined starvation threshold, the second condition includes the number of VLES groups available for dispatch is indicative of going below a predetermined upper limit threshold, and the third condition includes the number of VLES groups available for dispatch is indicative of being between the predetermined starvation threshold and the predetermined upper limit threshold, and a fetch-ahead of a Fetch Set occurred in an immediately previous cycle.

11. The fetch-ahead control apparatus of claim 10, wherein the VLES end detector is configured to detect one or more VLES ends within the pre-fetched Fetch Sets and increment the available VLES counter by the number of detected VLES ends.

12. The fetch-ahead control apparatus of claim 10, further comprising:

the VLES dispatch unit coupled to the available VLES counter and arranged to decrement the available VLES counter when a VLES group available for dispatch is dispatched to one or more processing resources within the VLES processor architecture.

\* \* \* \* \*